Figure 1:
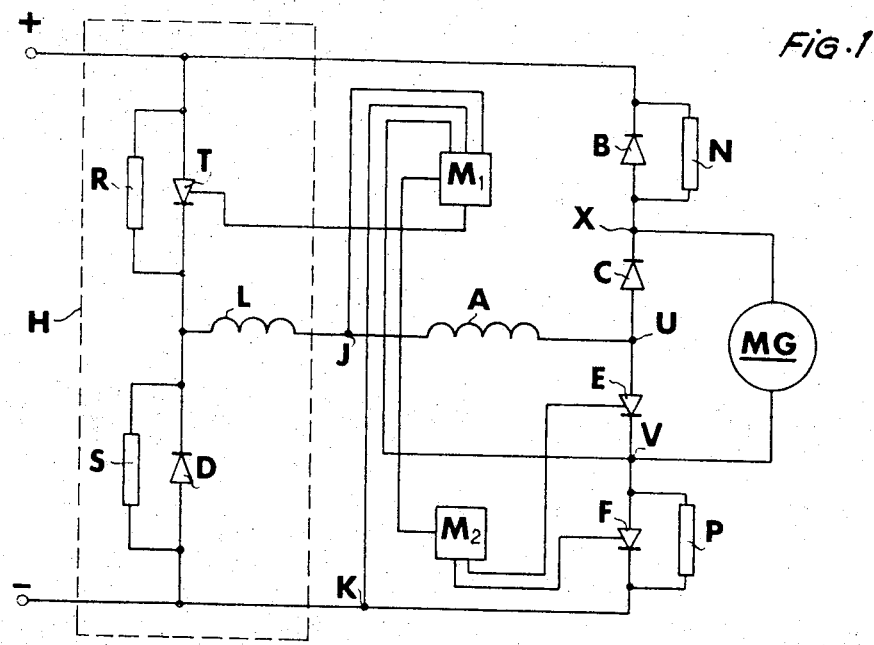

United States Patent [19]

Mehta

[11] 3,769,566

[45] Oct. 30, 1973

[54] STATIC SWITCHING SYSTEM FOR INSTANTANEOUS CHANGEOVER AN ELECTRIC MACHINE

[75] Inventor: Robert Mehta, Paris, France

[73] Assignee: Jeumont-Schneider, Paris, France

[22] Filed: Oct. 25, 1972

[21] Appl. No.: 300,739

[30] Foreign Application Priority Data

Oct. 26, 1971 France .............................. 7138388

[52] U.S. Cl. ................... 318/375, 321/93, 318/139, 318/376

[51] Int. Cl. ........................................ H02p 3/14

[58] Field of Search .................... 318/139, 375, 376

[56] References Cited
UNITED STATES PATENTS

| | | | |
|---|---|---|---|
| 3,538,404 | 11/1970 | Risberg | 318/376 X |
| 3,546,548 | 12/1970 | Wouk | 318/376 X |
| 3,548,275 | 12/1970 | Inagaki et al. | 318/376 X |
| 3,560,817 | 2/1971 | Amato | 318/139 X |
| 3,601,670 | 8/1971 | Eriksson | 318/376 X |
| 3,651,390 | 3/1972 | Vidal et al. | 318/379 X |
| 3,699,419 | 10/1972 | Jinzenji et al. | 318/376 X |
| 3,729,664 | 4/1973 | Montross | 318/139 |

Primary Examiner—William M. Shoop, Jr.
Attorney—Raymond Robic

[57] ABSTRACT

Static switching system for instantaneous changeover of a series DC machine energized by a current chopper. The field of the machine is connected at a first point to the smoothing choke of the chopper and at a second point between two rectifying arms, one made of diodes and the ether made of thyristors, the armature of the machine being connected between two mid-points of the above rectifying arms. A first control logic determines the voltages between the above mentioned first point and the mid-points of the rectifying arms. A second control logic triggers the thyristors in function of such voltages to perform the changeover.

2 Claims, 2 Drawing Figures

PATENTED OCT 30 1973 3,769,566

STATIC SWITCHING SYSTEM FOR INSTANTANEOUS CHANGEOVER AN ELECTRIC MACHINE

The invention relates to a static switching system for instantaneous changeover of a series DC machine energized e.g. by a current chopper, of use more particularly for the immediate changeover of a traction machine from motoring to generating so that the machine can be used for regenerative or rheostatic braking.

Of course, when a series machine is changed over from motoring to generating, the direction of current flow through the field must not reverse, the reason for this being that the remanent electromotive force is needed to start the machine off when it runs as a generator.

Switching systems which can provide switching of this kind are known; unfortunately, they are electromechanical systems and take some time to operate. In electric traction, inter alia in the case of automatic control of driving vehicles, this time lapse militates against instantaneous traction motor braking, and very frequent braking soon damages the switching systems.

This invention helps to obviate these disadvantages since it relates to a static switching system which can provide instantaneous changeover of a traction machine and which is more reliable than electromechanical systems.

As a rule, of course, choppers comprise a main thyristor which serves to close the load circuit and which is returned to the non-conductive state by a reverse current applied either by a capacitor or by an oscillatory circuit via another thyristor called the turn-off thyristor, the inductive load circuit being shunted by an antiparallel diode called the discharge diode via which current can continue to flow during non-supply periods.

Also, of course, in the case of chopper-supplied traction machinery the chopper is used in series coupling — i.e., as a voltage reducer — for motoring and in parallel coupling — i.e., as a voltage booster — for generating. A chopper with these two forms of coupling is used in the static switching system provided by the invention.

The system according to the invention is characterised in that:

the discharge diode and the main thyristor of the chopper are shunted by high resistances so as to set the potential of the condition between the thyristor and the diode relatively to the terminals of the chopper DC supply;

the maching field is in series with a smoothing choke between such connection and a point common to two semi-conductor rectification arms, the first arm comprising two groups of diodes in series, the second arm comprising two groups of thyristors in series, the thyristors and diodes being arranged the same way round as seen from the common point, the other end of the diode arm being connected to that side of the supply which is connected to the main thyristor while the other end of the thyristor arm is connected to that side of the supply which is connected to the discharge diode;

the machine armature is connected between the centre points of the two arms, high resistances shunting the groups of diodes and thyristors connected between the centre points and the supply terminals so as to set the potentials of the centre points;

and in that the system comprises:

means for blocking the main thryristor of the chopper and simultaneously measuring the voltages between one side of the supply and the centre point of the thyristor arm and between one side of the supply and the connection between the smoothing choke and the field;

means for turning-on the chopper thyristor simultaneously with, depending upon the kind of changeover effected;

either the thyristor group directly connected to the field, the other thyristor group being non-conductive, for a changeover from motoring to generating, or the thyristor group connected directly to the discharge diode, the other thyristor group being non-conductive, for a changeover from generating to motoring;

the turning-on operation being initiated at the time when the thyristor arm centre point is at a higher potential than the choke-to-field connection, if the main thyristor is connected to the positive side of the supply, or at a lower potential if the main thyristor is connected to the negative side of the supply, the chopper and arm shunt resistances being chosen to permit such potential differences.

In a variant of the invention the system is used for two machines each having two rectifying arms identical to those just mentioned, the arm ends being connected as in the previous case to the supply terminals, but the points common to each pair of arms are respectively connected to the smoothing choke output terminals via one of the machine fields, the armature of one machine is connected between the diode arm centre point of such machine and the centre point of the thyristor arm of the other machine, the voltage-measuring means are extended to the centre points of the thyristor arms of the two machines, and the thyristor trigger controlling means are extended to the thyristors of each arm, the circuit elements of each machine being controlled simultaneously.

Figure 2:
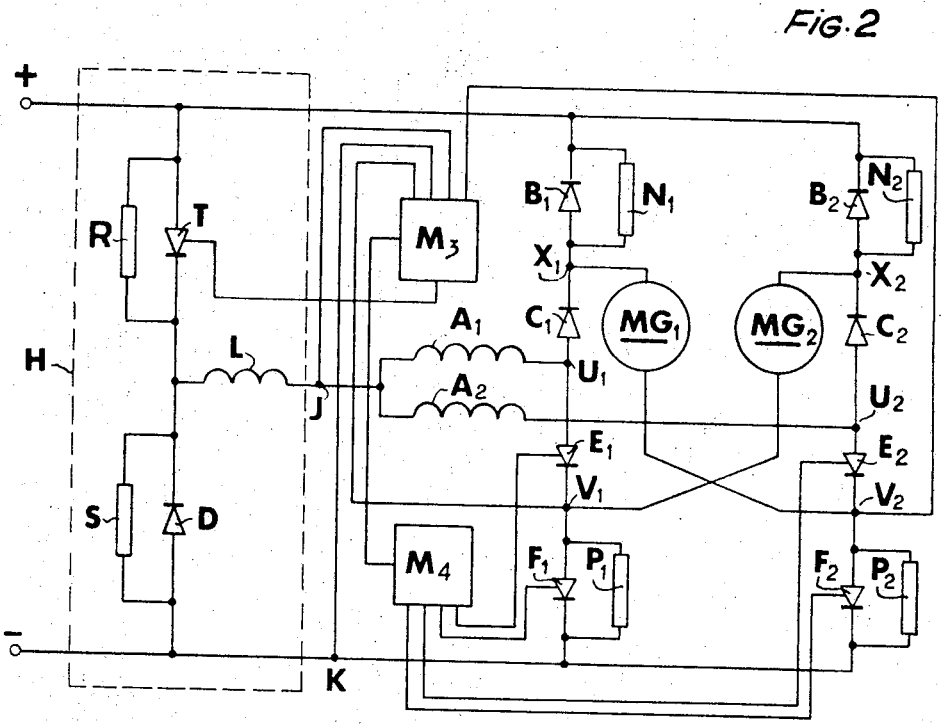

The invention will be better understood by means of an embodiment and of the accompanying drawings wherein:

FIG. 1 shows the circuit diagram of a static switching system for a single machine, and FIG. 2 is a corresponding circuit diagram for two machines.

Referring to FIG. 1, a chopper H is shown in simplified form inside chain-line framing and is represented by its main thyristor T, its discharge diode D and its smoothing choke L. The DC supply for the chopper is represented by its positive and negative terminals. Diode D is shunted by a high resistance S and thyristor T is shunted by a high resistance R, to determine the potential of their cathodes, which are connected to the choke L, relatively to the positive and negative sides of the supply.

Field A of a DC machine connects choke L to a point U common to two semiconductor rectifying arms, one comprising two diodes C, B in series and the other comprising two thyristors E, F in series, the anodes of the semiconductors C, E being connected to the point U.

The cathode of thyristor F is connected to the negative side of the supply and the cathode of diode B to the positive side thereof. The armature of machine MG is connected between the cathode of thyristor E and the cathode of diode C —i.e., between points V and X. Semiconductor B is shunted by a high resistance N and semiconductor F is shunted by a high resistance P, to determine the potentials of the points X, V when the thyristors E, F are non-conductive. The resistances P, N have a value such that the potential of point V is above the potential of point J —i.e., of the connection between choke L and field A — when the thyristors T, E, F are non-conductive, this condition being necessary for changing over operation of the machine. The changeover is then controlled by means of two control logics $M_1$, $M_2$; the first logic $M_1$ blocks thyristor T and measures the potential difference between points J and K and the potential difference between points J and K and the potential difference between points V and K, point D corresponding to the negative side of the supply. The second logic $M_2$ initiates the turning-on of the thyristors E and T for a changeover of the machine to generating, or the turning-on of the thyristors F and T for a changeover of the machine to motoring; however, the device $M_2$ initiates such turning-on operations only when permitted to do so by $M_1$ — i.e., when the condition just described for the potentials has been checked by $M_1$.

Assuming, for instance, that the machine is motoring and it is required to change it over to generating, $M_1$ blocks the chopper thyristor T, with the result of blocking thyristor F, which extinguishes on its own, $M_1$ simultaneously measuring the potential differences referred to. When the potential of the point J drops below the potential of point V, $M_1$ permits the changeover, whereupon $M_2$ initiates the turning-on of the thyristors E, T. Chopper H then resumes normal operation, the diode C and the thyristor F no longer conducting current, and the machine MG can output either to the supply or to a rheostat connected up instead of the supply.

If, on the other hand, the machine MG is generating and it is required to change it over to motoring, $M_1$ blocks the chopper thyristor T, so that the thyristor E is blocked due to lack of current, $M_1$ simultaneously measuring the potential differences referred to. When the potential of the point J drops below the potential of the point V, $M_1$ permits the changeover, whereupon $M_2$ initiates the turning-on of thyristors F, T. Chopper H then resumes normal operation, the semi-conductor B and the thyristor E no longer conducting current.

In FIG. 2, which is for the case of two machines $MG_1$, $MG_2$, like references denote the same elements as in FIG. 1 except that the integers B N X C U E V F P have either the index 1 or the index 2, according as they are associated with the first machine or the second machine, the integers being connected in just the same way as in FIG. 1, but in two parallel circuits, to the power supply. However, to balance the two machines the first has its armature connected between $X_1$ and $V_2$ and the second has its armature connected between $X_2$ and $V_1$. Also, field $A_1$ of the first machine is connected between J and $U_1$, and field $A_2$ of the second machine is connected between J and $U_2$.

Instead of the control logics $M_1$, $M_2$ of the first embodiment, there are slightly different logics $M_3$, $M_4$, $M_3$ measuring the potential differences between the points $V_1$, $V_2$ and K instead of between V and K, while $M_4$ acts on the gates of thyristors $E_1$, $E_2$, $F_1$, $F_2$ instead of on E and F; the integers $M_3$, $M_4$ act simultaneously on the two parallel circuits, whereas the integers $M_1$, $M_2$ of FIG. 1 where operative on just one circuit. The operation described for one machine is unchanged for two machines, the unindexed references being replaced by references having the corresponding index 1 or 2.

The invention is of use for separately excited machines. Its main use is for electrical machinery on driving vehicles, inter alia automatically controlled vehicles.

I claim:

1. A static switching system for instantaneous changeover of a series wound DC machine supplied in antiparallel by chopper comprising a discharge diode, characterised in that:

the discharge diode and the main thyristor of the chopper are shunted by high resistances so as to set the potential of the connection between the thyristor and the diode relatively to the terminals of the chopper DC supply;

the machine field is in series with a smoothing choke between such connection and a point common to two semi-conductor rectification arms, the first arm comprising two groups of diodes in series, the second arm comprising two groups of thyristors in series, the thyristors and diodes being arranged the same way round as seen from the common point, the other end of the diode arm being connected to that side of the supply which is connected to the main thyristor while the other end of the thyristor arm is connected to that side of the supply which is connected to the discharge diode;

the machine amerture is connected between the centre points of the two arms, high resistances shunting the groups of diodes and thyristors connected between the centre points and the supply terminals so as to set the potentials of the centre points;

and in that the system comprises:

means for blocking the main thyristor of the chopper and simultaneously measuring the voltages between one side of the supply and the centre point of the thyristor arm and between one side of the supply and the connection between the smoothing choke and the field;

means for turning-on the chopper thyristor simultaneously with depending upon the kind of changeover effected;

either the thyristor group directly connected to the field, the other thyristor group being non-conductive, for a changeover from motoring to generating, or the thyristor group connected directly to the discharge diode, the other thyristor group being non-conductive, for a changeover from generating to motoring;

the turning-on operations being initiated at the time when the thyristor arm centre point is at higher potential than the choke-to-field connection, if the main thyristor is connected to the positive side of the supply, or at a lower potential if the main thyristor is connected to the negative side of the supply, the chopper and arm shunting resistances being chosen to permit such potential differences.

2. A static switching system according to claim 1, but used with two identical electrical machines each having two rectifying arms of the kind mentioned above but in which the points common to each pair of arms are respectively connected to the smoothing choke terminals via one of the machine fields, the armature of one machine is connected between the dioe arm centre point of such machine and the centre point of the thyristor arm of the other machine, the voltage-measuring means are extended to the centre points of the thyristor arms of the two machines, and the thyristor trigger controlling means are extended to the thyristors of each arm, the circuit elements of each machine being controlled simultaneously.

* * * * *